(No Model.)

J. WINEMILLER.
LISTED CORN CULTIVATOR.

No. 465,988. Patented Dec. 29, 1891.

Witnesses
Samuel Ker.
Geo. H. Parmelee

Inventor
Jacob Winemiller
by E. H. Reenor Co
his Attorneys

UNITED STATES PATENT OFFICE.

JACOB WINEMILLER, OF SHERIDAN, MISSOURI.

LISTED-CORN CULTIVATOR.

SPECIFICATION forming part of Letters Patent No. 465,988, dated December 29, 1891.

Application filed August 8, 1891. Serial No. 402,121. (No model.)

*To all whom it may concern:*

Be it known that I, JACOB WINEMILLER, a citizen of the United States, residing at Sheridan, in the county of Worth and State of Missouri, have invented certain new and useful Improvements in Listed-Corn Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
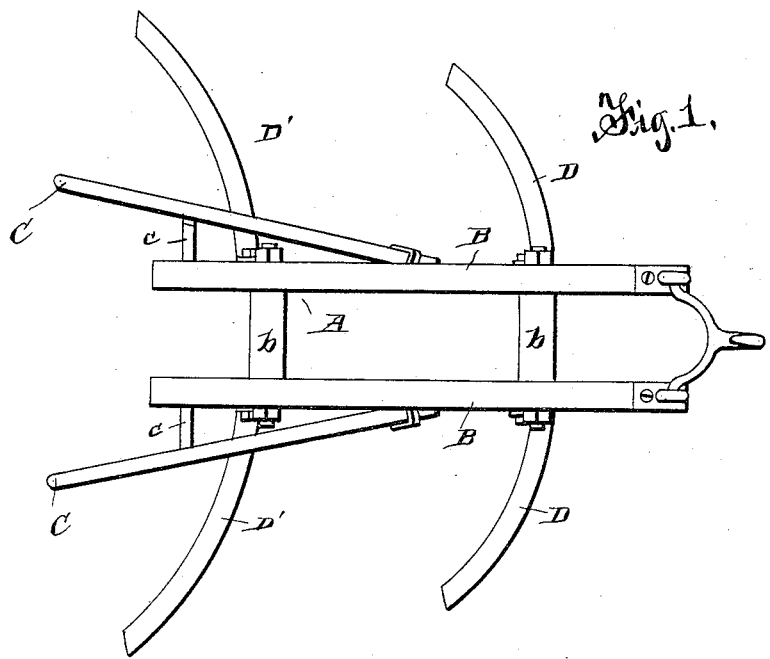
Figure 2:
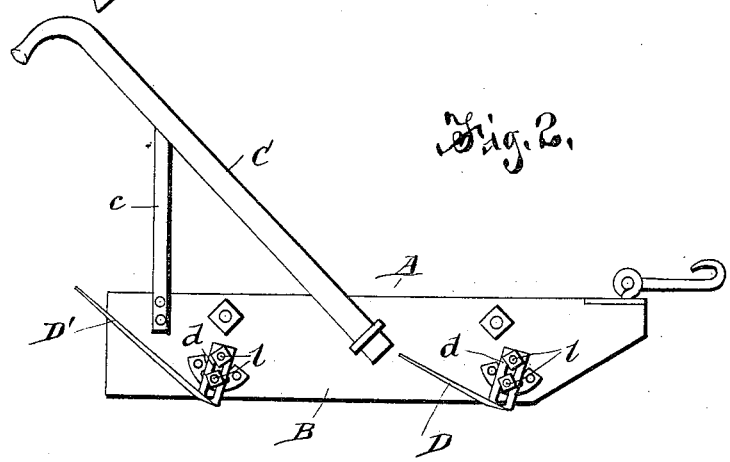
Figure 3:
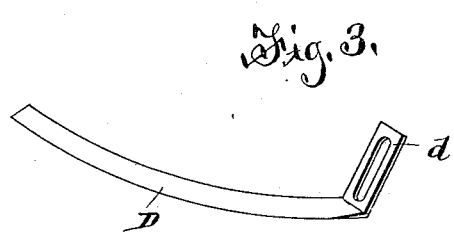

Figure 1 of the drawings is a top plan view. Fig. 2 is a side view, and Fig. 3 is a detail view.

This invention has relation to corn-cultivators or plows especially adapted for use with small listed corn or other plants; and it consists in the novel construction and combination of parts, as hereinafter described, and pointed out in claim.

In the accompanying drawings, the letter A designates the frame of the machine, which comprises the parallel runners B B, connected by the cross bars or braces *b b*.

C C are the handles, secured one to each runner and supported upon the braces *c c*.

D D and D' D' represent the shares or cutters, D D being the forward pair and D' D' the rear pair, secured to the runners B B and extending laterally therefrom. These shares consist each of an inwardly-curved steel blade having a sharp forward or cutting edge slightly inclined below the horizontal and its outer ends curved upwardly, as shown. The inner ends have an arm *d*, provided with an oblong slot, through which passes the securing-bolts *l*. By means of this slot the shares may be vertically and angularly adjusted. The forward shares D D are preferably only about two-thirds of the length of the rear shares D' D'. It will be seen that the runners B B, straddling the hill, will effectually set up all listed plants, being superior to the old form of disks or wheels, in that the latter, especially in sandy or mellow soil, are apt to go too deep, injuring the roots and carrying too much soil to the hills. The shares D D and D' D' will cut up all weeds between the rows, loosening the earth, and by reason of the upwardly-curved positions preventing injury to the plants on either side.

Having described this invention, what I claim as new, and desire to secure by Letters Patent, is—

A cultivator or plow comprising the parallel runners, and the shares D D', secured to each runner and projecting laterally therefrom, said shares being of different lengths and comprising each a metallic blade provided with a cutting-edge gradually curved rearwardly, the outer end of each blade being curved upwardly and its inner end having an upwardly-turned arm *d*, provided with an elongated slot therein, through which passes an adjustable securing-bolt, whereby said cutters may be adjustable both vertically and angularly, substantially as specified.

In testimony whereof I affix my signature in presence of two witnesses.

JACOB WINEMILLER.

Witnesses:
JOHN W. BAINUM.
GEO. L. FIELD.